US009058064B2

(12) United States Patent
Liang et al.

(10) Patent No.: US 9,058,064 B2
(45) Date of Patent: Jun. 16, 2015

(54) INTERACTIVE IMAGE SYSTEM, INTERACTIVE CONTROL DEVICE AND OPERATION METHOD THEREOF

(75) Inventors: Chia-Cheun Liang, Hsin-Chu (TW); Ming-Tsan Kao, Hsin-Chu (TW)

(73) Assignee: PIXART IMAGING INCORPORATION, R.O.C., Hsin-Chu (TW)

(*) Notice: Subject to any disclaimer, the term of this patent is extended or adjusted under 35 U.S.C. 154(b) by 233 days.

(21) Appl. No.: 13/446,524

(22) Filed: Apr. 13, 2012

(65) Prior Publication Data

US 2013/0002552 A1 Jan. 3, 2013

(30) Foreign Application Priority Data

Jul. 1, 2011 (TW) .............................. 100123349 A

(51) Int. Cl.
*G06F 3/03* (2006.01)
*G06F 1/32* (2006.01)
*G06F 3/0346* (2013.01)

(52) U.S. Cl.
CPC ............ *G06F 3/0325* (2013.01); *G06F 1/3259* (2013.01); *G06F 3/0346* (2013.01); *Y02B 60/1253* (2013.01); *Y02B 60/148* (2013.01)

(58) Field of Classification Search
CPC . G06F 3/0325; G06F 3/03542; G06F 3/0386; G06F 3/0383; G06F 3/0304; G06F 3/0346; G06F 3/033; G06F 3/038; G06F 1/3259; G06F 1/325; G06F 1/32; G06F 1/3234; G06F 1/3206; Y02B 60/1253; Y02B 60/12; Y02B 60/148
See application file for complete search history.

(56) References Cited

U.S. PATENT DOCUMENTS

| 7,619,669 | B2 | 11/2009 | Barna et al. | |
|---|---|---|---|---|
| 7,738,013 | B2 | 6/2010 | Galambos et al. | |
| 7,839,388 | B2 | 11/2010 | Cheah et al. | |
| 8,462,155 | B1* | 6/2013 | Allen et al. | 345/420 |
| 8,843,346 | B2* | 9/2014 | Hodge et al. | 348/135 |
| 2005/0110746 | A1* | 5/2005 | Hou | 345/156 |
| 2006/0152489 | A1* | 7/2006 | Sweetser et al. | 345/158 |
| 2006/0258465 | A1 | 11/2006 | Lin et al. | |
| 2007/0024587 | A1 | 2/2007 | Shiau | |
| 2007/0262243 | A1* | 11/2007 | Cheah et al. | 250/214 R |
| 2008/0180396 | A1* | 7/2008 | Lin et al. | 345/158 |
| 2008/0198129 | A1* | 8/2008 | Cheng et al. | 345/156 |
| 2008/0266251 | A1* | 10/2008 | Chao et al. | 345/157 |
| 2008/0284724 | A1* | 11/2008 | Alten | 345/156 |
| 2009/0009469 | A1* | 1/2009 | Hsu et al. | 345/158 |
| 2009/0052730 | A1* | 2/2009 | Lin | 382/100 |
| 2009/0161026 | A1* | 6/2009 | Wu et al. | 348/734 |
| 2009/0195505 | A1 | 8/2009 | Chen et al. | |
| 2010/0277411 | A1 | 11/2010 | Yee et al. | |
| 2012/0198258 | A1* | 8/2012 | Lye et al. | 713/323 |
| 2012/0319941 | A1* | 12/2012 | Wheatley et al. | 345/156 |

* cited by examiner

*Primary Examiner* — Dwayne Bost
*Assistant Examiner* — Ivelisse Martinez Quiles
(74) *Attorney, Agent, or Firm* — Tung & Associates

(57) ABSTRACT

An interactive image system includes a host generating interactive images; a light source generating at least one light beam; and an interactive control device transmitting data to the host and switching between an operation status and an idle status. The interactive control device includes: an image sensor capturing a first picture in the idle status, wherein the first picture has a reference point image formed by the light beam; and a control circuit selecting a pixel area according to the position of the reference point image in the first picture, controlling the image sensor to obtain a second picture according to the pixel area, and comparing a threshold value with the brightness information of at least one pixel in the pixel area of the second picture to confirm whether the interactive control device is still in the idle status.

22 Claims, 3 Drawing Sheets

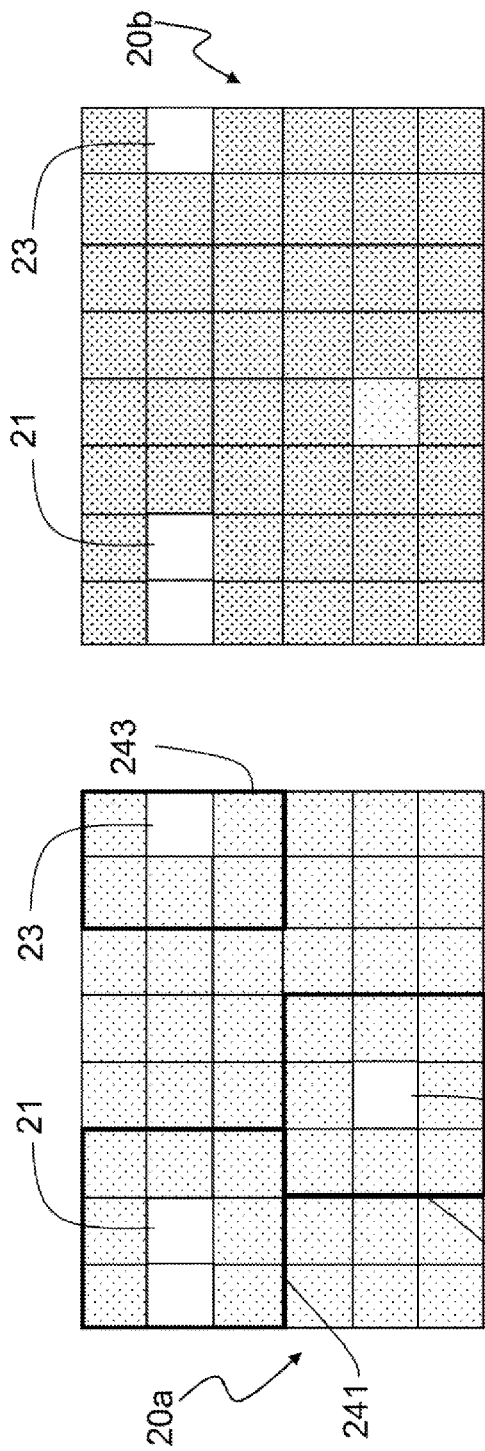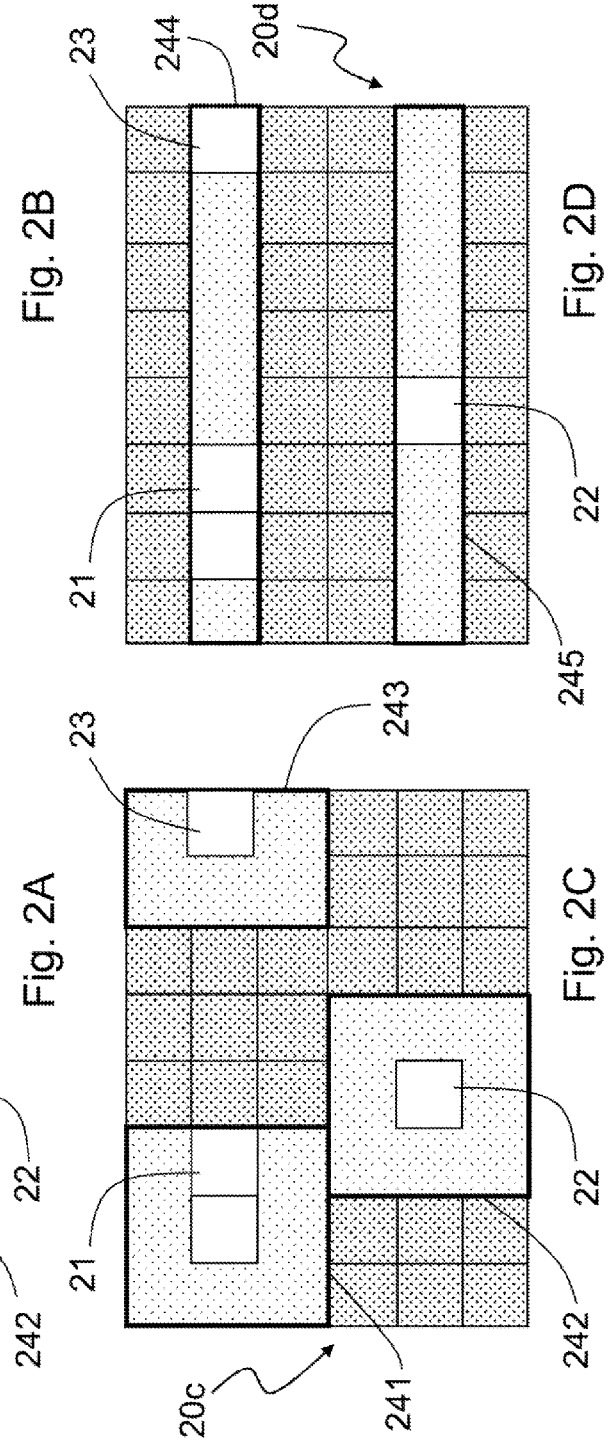
Fig. 2A
Fig. 2B
Fig. 2C
Fig. 2D

INTERACTIVE IMAGE SYSTEM, INTERACTIVE CONTROL DEVICE AND OPERATION METHOD THEREOF

CROSS REFERENCE

The present invention claims priority to TW 100123349, filed on Jul. 1, 2011.

BACKGROUND OF THE INVENTION

1. Field of Invention

The present invention relates to an interactive image system, an interactive control device and an operation method thereof, in particular to such interactive image system, interactive control device and operation method wherein the criteria for sampling images by an image module is dynamically adjusted in an idle status so as to save electric power.

2. Description of Related Art

In a conventional game remote controller, e.g. the "pointer positioning device including a video camera" disclosed in Taiwan Invention Patent No. I267754 which can be applied to a light gun game, a control circuit is provided and connected to a camera, a calculating unit and a communication interface. The communication interface is connected to a host. An optical filter is disposed in front of the camera, and several lighting devices to be photographed by the camera are disposed on a display. When a user uses a pointer device to point to the display whereby a corresponding program is executed by the host, the camera photographs the display and the lighting devices, and since the camera is covered by the optical filter which filters the light with outside the spectrum of the light emitted by the lighting devices, only the light of the lighting devices appears on the images captured by the camera. Then, the images are processed by the calculating unit to obtain a coordinate of the aiming point of the pointer device, and the coordinate is transmitted to the host such that the host can use it to perform corresponding control.

However, for convenience in practical use, the remote controller is usually designed to wirelessly communicate with the host for data transmission, and a battery module is used to supply the remote controller with the required electric power. Because the remote controller has several power consuming devices, it is necessary to reduce the power consumption of the devices as low as possible so as to prolong the lifetime of the battery module. Normally, the camera preferably captures images with a high sampling frequency so as to increase the accuracy of calculation for the calculating unit to calculate the coordinate of the aiming point. However, high image sampling frequency increases the calculation loading of the calculating unit and the total power consumption of the remote controller, and therefore the lifetime of the battery module will be shortened.

Taiwanese Invention Patent Publication No. 200912700 discloses a displacement detection apparatus and a power saving method. The displacement detection apparatus is an optical mouse, comprising a lighting source and an image capturing unit, wherein the image capturing unit captures images formed by projecting light on a surface. The displacement detection apparatus calculates the difference between the positions of a reference object shown in sequential images to obtain a motion vector. When the value of the motion vector is always smaller than a threshold during a predetermined period, the displacement detection apparatus is confirmed to be in an idle status rather than an operation status. If the displacement detection apparatus is in the idle status, it reduces the flash frequency (or light projection frequency) of the light source to save electric power. Similarly, Taiwanese Invention Patent Publication No. 200943131 discloses a displacement detection apparatus and a power saving method. The displacement detection apparatus adjusts the lighting period of the light source according to the value of the displacement of the apparatus between two sequential lighting periods, to reduce power consumption.

Taiwanese Invention Patent No. I338241 discloses an interactive image system, an interactive apparatus and an operation method thereof. The interactive apparatus adaptively adjusts the sampling frequency of the image module to save its total power consumption.

All the above prior art references have the drawback that, regardless whether they reduce the sampling frequency of the image module or reduce the flash frequency of the light source, they all capture an entire frame and process the data of the entire frame. For this reason the power consumption cannot be effectively reduced.

In view of above, the present invention provides an interactive image system, an interactive control device and an operation method wherein the image module of an interactive apparatus dynamically adjusts the criteria for sampling images in an idle status, so as to save electric power.

For reference, the following patents or patent publications disclose contents related to the present application: U.S. Pat. No. 7,839,388; U.S. Pat. No. 7,738,013; U.S. Pat. No. 7,619,669; US 2007/0024587; US 2009/0161026; US 2009/0052730; US 2009/0195505.

SUMMARY OF THE INVENTION

An objective of the present invention is to provide an interactive image system capable of saving electric power.

Another objective of the present invention is to provide an interactive control apparatus of the interactive image system.

Another objective of the present invention is to provide an operation method of the interactive image system.

To achieve the foregoing objectives, in one aspect, the present invention provides an interactive image system, comprising: a host generating interactive images; a light source generating at least one light beam; and an interactive control device transmitting data to the host and switching between an operation status and an idle status, the interactive control device including: an image sensor capturing a first picture in the idle status, wherein the first picture has a reference point image formed by the light beam; and a control circuit selecting a pixel area according to a position of the reference point image in the first picture, controlling the image sensor to obtain a second picture according to the pixel area, and comparing a threshold value with brightness information of at least one pixel in the pixel area of the second picture to confirm whether the interactive control device is still in the idle status.

In one embodiment, the reference point image has a size of one or more pixel cells, and the pixel area is a pixel region of the whole or a portion of the pixel cells. For example, the middle of the pixel region has a pixel with highest brightness.

In one embodiment, the reference point image has a size of one or more pixel cells, and the pixel area is a pixel region including and larger than the one or more pixel cells.

In one embodiment, the brightness information is the brightness of a pixel in the pixel area or an average of the brightness of pixels in the pixel area.

In another aspect, the present invention provides an interactive control device transmitting data to a host and switching between an operation status and an idle status, the interactive control device including: an image sensor capturing a first picture in the idle status, wherein the first picture has a reference point image formed by a light beam projected from a light source; and a control circuit selecting a pixel area according to a position of the reference point image in the first picture, controlling the image sensor to obtain a second picture according to the pixel area, and comparing a threshold value with brightness information of at least one pixel in the pixel area of the second picture to confirm whether the interactive control device is still in the idle status.

In another aspect, the present invention provides an operation method for an interactive image system, comprising: capturing a first picture when the interactive image system is in an idle status; selecting a pixel area according to a position of at least one reference point image in the first picture; obtaining a second picture according to the pixel area; and comparing a threshold value with brightness information of at least one pixel in the pixel area of the second picture to confirm whether the interactive image system is still in the idle status.

In one embodiment, the method further comprises a step of: when the interactive image system is still in the idle status after confirmation, reducing a sampling frequency of capturing pictures or reducing a light projection frequency of the light source.

In one embodiment, the interactive image system enters the operation status when it is confirmed not to be in the idle status.

The objectives, technical details, features, and effects of the present invention will be better understood with regard to the detailed description of the embodiments below, with reference to the drawings.

BRIEF DESCRIPTION OF THE DRAWINGS

FIGS. 2A-2D are pictures captured by an interactive apparatus according to the present invention, wherein each picture includes one or more reference point images.

DESCRIPTION OF THE PREFERRED EMBODIMENTS

The present invention is applicable to interactive games executed by a game host, remote-control for browsing Internet pages on a display, remote-control or other operations for video systems (e.g. smart TV), etc. Because the game host is currently popular, the following description will take it as an example to explain the details of the present invention.

Figure 1:
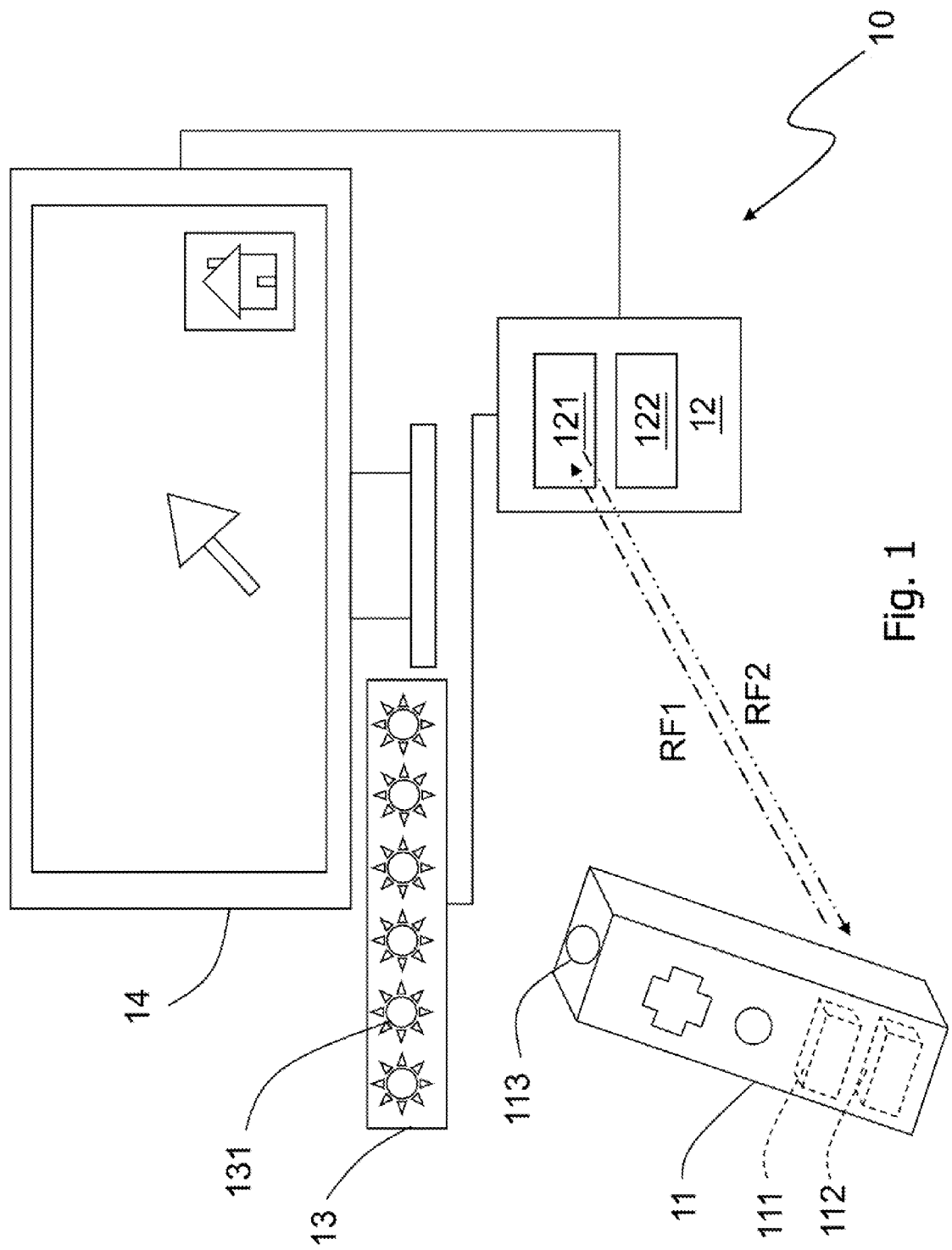
FIG. 1 shows a schematic diagram of an interactive image system according to an embodiment of the present invention.

Referring to FIG. 1, it shows a schematic diagram of an interactive image system according to an embodiment of the present invention. The interactive image system 10 comprises an interactive control apparatus 11, a host 12, a light source 13, and a display 14. The host 12 for example may be a game host, a computer system, or an interactive video player, which can execute an interactive game program to generate interactive images shown on the display 14 for a user to play and to interact with. The host 12 includes a wireless module 121 and a processor 122, and it bi-directionally transmits (such as by RF1 and RF2) data to/from the interactive control apparatus 11 through the wireless module 121. The processor 122 processes the data to execute the interactive game. The host 12 can be coupled to the display 14 in a wired manner or a wireless manner, or can be directly integrated into the display 14.

The screen of the display 14 shows a cursor. The cursor may be, for example but not limited to, a point of aim by a light gun, an arrow for clicking an icon, and so on. The interactive control apparatus 11 includes a wireless module 111, a control circuit 112, and an image sensor 113. The image sensor 113 can capture the images of the reference points 131 in the light source 13. The control circuit 112 determines the position and the direction and amount of the displacement of the interactive control apparatus 11 according to the image of the reference points 131. That is, the position and the displacement of the cursor are determined accordingly.

The reference points 131 of the light source 13 may be, for example but not limited to, several infrared LEDs (light emitting diode) or several lighting units with a specific wavelength arranged in a regular or irregular shape. The light source 13 can be coupled to the host 12 or the display 14, or it can be powered by an independent power source for lighting. The light source 13 also can be integrated into the display 14 or the host 12. The number of the reference points 131 is not limited to 6 as shown in this figure; it can be one or plural, i.e., any number. The interactive control apparatus 11 captures the images of these reference points 131 to calculate the changes in the relative positions and/or the relative angles between the interactive control apparatus 11 and the reference points 131, and controls the position and the displacement of the cursor on the display 14 accordingly. In this embodiment, the interactive control apparatus 11 is used to control a game program or computer software executed by the host 12. In the former case, the interactive control apparatus 11 for example may be used as, or even has an appearance as, for example but not limited to, a light gun, a cue, a golf club, a tennis racket, a baseball bat, a badminton racket, a table tennis racket and so on, for a user to control the progress of the game. In the latter case, the interactive control apparatus 11 for example may be used as the positioning apparatus of a pointer (or a cursor).

FIGS. 2A-2D are pictures captured by an interactive apparatus in an idle status according to the present invention, wherein each picture includes one or more reference point images. Whether the system should enter the idle status can be determined by any known method. For example, it can be determined according to whether the value of the motion vector is smaller than a threshold for a predetermined time period. All such determination methods are included in the scope of the invention. In each picture 20a-20d captured by the image sensor 113, there is one or more reference points. FIG. 2A shows an entire image captured in an idle status. The reference point image is an area which includes a reference point (in the form of a bright spot). In the example shown in FIG. 2A, the reference point images are 21-23, each of which includes one pixel unit. However, this is only an example and a reference point image may include more than one pixel unit; and, one pixel unit shown in the figure can include one or more pixel cells.

In FIG. 2A, the picture 20a has three reference point images 21-23, represented by the white regions. The other dotted regions are pixel units where the image sensor 113 cannot find any reference point images. The picture 20a is a picture which the image sensor 113 obtains by scanning every pixel unit.

In FIG. 2B, the picture 20b is obtained by the image sensor 113 which only scans the pixel cells corresponding to the three point images of the picture 20a, while the other pixel cells are not scanned ("inactivated") to reduce the power consumption. The heavily dotted regions are pixel units which are inactivated and not scanned by the image sensor 113. That is, the control circuit 112 of the interactive control apparatus 11 only activates the pixel cells corresponding to the three reference point images 21-23 of the picture 20a, and only scans these pixel cells. After scanning only the activated regions, it is found that the reference point images 21 and 23 are still obtained at the same positions, but the reference point image 22 is not found (represented by the lightly dotted region). Hence, the control circuit 112 controls the interactive control apparatus 11 to switch from the idle status to the operation status.

In order to confirm whether at least one of the reference point images does not exist at the original position of the picture 20a and switch the interactive control apparatus 11 to the operation status, the control circuit 112 can compare the brightness information of the pixels of the picture 20b corresponding to the three reference point images 21-23 of the picture 20a with a threshold value. For example, if the brightness or average brightness of the pixel unit of the picture 20b corresponding to the reference point image 22 of the picture 20a is smaller than a predetermined threshold value, it is confirmed that the reference point image 22 has left its original position in the picture 20a. On the contrary, if the brightness of the pixel unit is larger than the predetermined threshold value, it is confirmed that the reference point image 22 still stays at its original position of the picture 20a. If all the reference point images 21-23 are still at their original positions, it is confirmed that the interactive control apparatus 11 is in the idle status. When it is confirmed that the interactive control apparatus 11 is still in the idle status, the control circuit 112 can further reduce the frame rate (or sampling rate) of the image sensor 113 or reduce the flashing frequency (light projection frequency) of the light source 13 to save more electric power. What is described in the above, i.e., if one reference point image (or bright spot) disappears in the next picture, the interactive control apparatus 11 is switched to the operation status, is only an example. It can be arranged so that if any one bright spot still exists in the next picture, the system is kept in the idle status; or, it can be set to keep the system in the idle status when at least N bright spots still exists in the next picture.

The picture 20b of FIG. 2B is obtained by only scanning the pixel cells of the three reference point images. However, there might be some noise, for example due to some slight vibration of the table supporting the interactive control apparatus 11, which causes an incorrect judgment to determine that the interactive control apparatus 11 has left the idle status. To avoid such incorrect judgment, the scanned area can extend outward from the pixel cells of the three reference point images of the picture 20a. In the example shown in FIG. 2A, the tree pixel areas 241-243 are the scanned areas (or called the noticeable areas). The pixel cells out of these areas are inactivated (not scanned) in scanning the next frame. The noticeable area can be an area including the pixel cell (s) of a reference point image plus pixel cells surrounding the pixel cell(s) of the reference point image, within a predetermined distance. The picture 20c of FIG. 2C is obtained by scanning the next frame. The reference point images 22-23 in the pixel areas 242-243 do not change their positions, but the position of the reference point image 21 in the pixel area 241 is shifted. Because the reference point image 21 is still in the pixel area 241, the control circuit 112 can determine that the interactive control apparatus 11 has not left the idle status yet. That is, if at least one bright spot is detected to be in each pixel area 241-243, it is determined that the interactive control apparatus 11 is still in the idle status. As to the existence of a bright spot, it can be determined by calculating whether the brightness of any pixel in the noticeable area is larger than a predetermined threshold value, and if yes, the pixel can be deemed as a location where a bright spot exists.

FIG. 2D shows another embodiment wherein after the three reference point images 21-23 are identified, in scanning the next frame, the scanned pixel areas 244 and 245 are the whole rows where the three reference point images 21-23 exist. According to the present invention, after the positions of the reference point images are identified, in scanning the next frame, the scanned area can be set to the same size of, an area larger than, or an area smaller than the size of the pixel cells corresponding to the reference point images, and the scanned area can be of any shape.

The foregoing embodiments are simplified examples for illustration. This paragraph is to give a practical example. Assume that the size of an image sensor is 128×96 pixel cells. If a first picture has two reference point images, and each of them includes around 30-50 pixels, then in the next picture, two scanned areas (i.e., two noticeable areas) can be defined, each of which is set to have a size of 50 pixel cells. In this way, when the system is in the idle status, the image sensor only needs to activate 0.81% of its pixel cells, because (50×2)/(128×96)=0.00813. Similarly, the processing circuit module of the interactive control apparatus 11 only needs to process data in proportion to the number of the activated pixel cells. Therefore, the power consumption can be significantly reduced.

Figure 3:
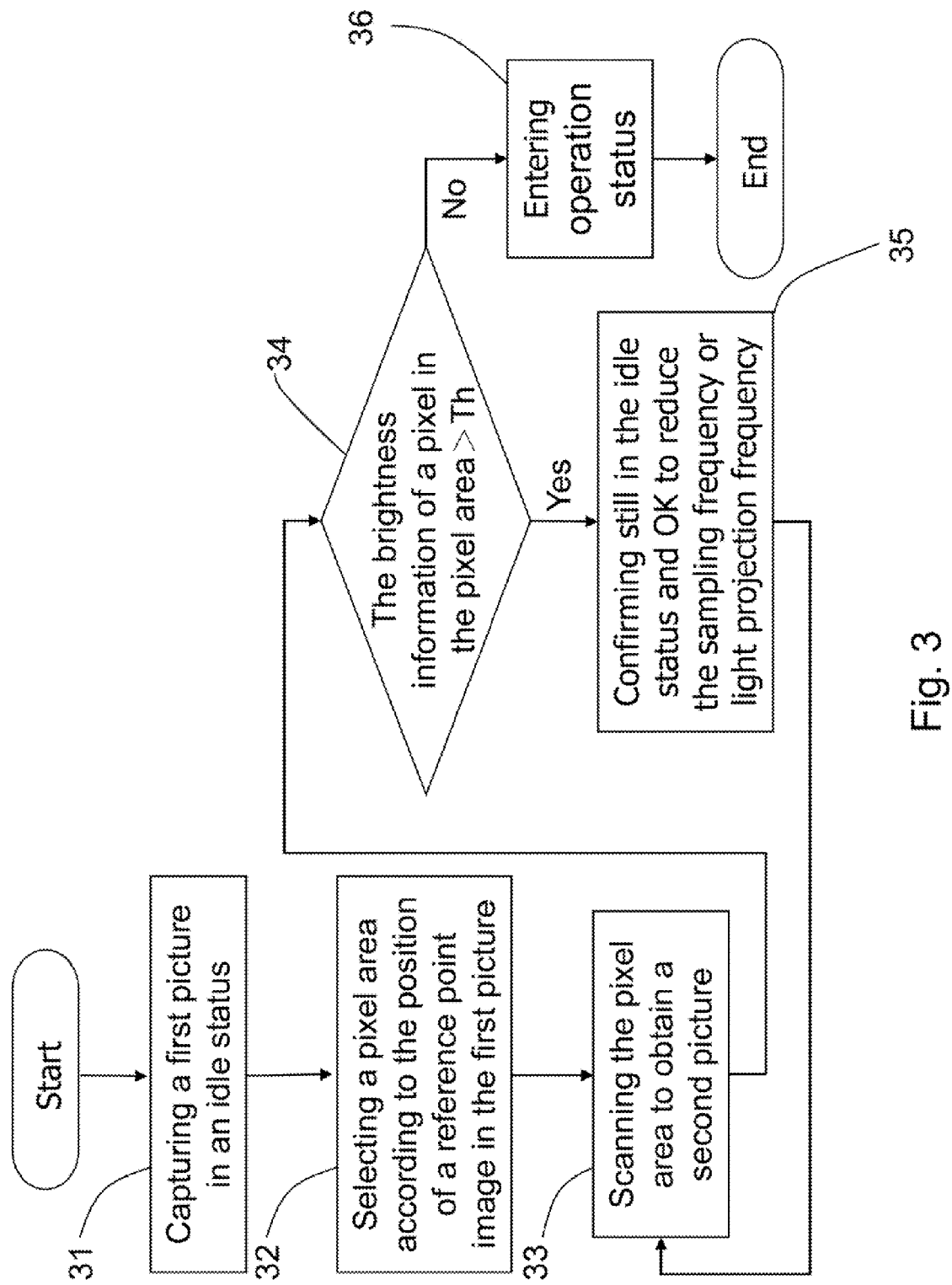
FIG. 3 shows a flow chart of an operation method for confirming an idle status according the present invention.

FIG. 3 shows a flow chart of an operation method for confirming an idle status according the present invention. Referring to Step 31, in the idle status, the interactive control apparatus can activate all of the pixel cells of the image sensor to capture a first picture. At least one pixel area (noticeable area) is selected according to the position of at least one reference point image in the first picture, as shown in Step 32. The noticeable area can include the same pixel cells of the reference point image, or the same pixel cells plus other pixel cells, as explained in the examples of FIGS. 2A-2D. In Step 33, the image sensor scans the pixel cells of the noticeable area to obtain a second picture. As shown in Step 34, a threshold value th is compared with the brightness information of the pixels in the noticeable area of the second picture; the brightness information for example can be the brightness value of one or more pixels, or the average brightness of plural pixels. If the brightness information is larger than the threshold value th, it means that the bright spot still stays in the noticeable area, then as shown in Step 35, the interactive control apparatus is confirmed to be in the idle status, and the image sensor can further reduce the sampling frequency, or the system can reduce the flash frequency of the light source to save the electric power. If the sampling frequency or the flash frequency is already down to the minimum, it does not need to be further reduced and the process can go back to Step 33. On the contrary, if comparison in Step 34 shows otherwise, it is determined that the reference point image has left its original position in the first picture, and the interactive control apparatus should enter the operation status, as shown in Step 36.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, the sizes and the number of the pixel areas can be different from the examples of the foregoing embodiments. Moreover, the method for confirming whether the reference point image still exists in each pixel area can be modified and there are various equivalent ways to do so. For example, the brightness of a single pixel or plural pixels in the pixel area can be quantized into brightness levels and whether a bright spot exists is determined according to whether the brightness is above a certain level. Thus, the present invention should cover all such and other modifications and variations, which should be interpreted to fall within the scope of the following claims and their equivalents.

What is claimed is:

1. An interactive image system, comprising:
   a host generating interactive images;
   a light source generating at least one light beam; and
   an interactive control device transmitting data to the host and switching between an operation status and an idle status, the interactive control device including:
     an image sensor capturing a first picture in the idle status, wherein the first picture has a reference point image formed by the light beam; and
     a control circuit selecting a pixel area according to a position of the reference point image in the first picture, wherein a size of the pixel area is smaller than a size of the first picture, controlling the image sensor to obtain a second picture by simply and only scanning the pixel area while leaving another pixel area other than the pixel area not-scanned, and comparing a threshold value with brightness information of at least one pixel in the pixel area of the second picture to confirm whether the interactive control device is still in the idle status;
     wherein when the brightness information of the at least one pixel in the pixel area of the second picture is smaller than the threshold value, the interactive control device switches from the idle status to the operation status; and
     when the brightness information of the at least one pixel in the pixel area of the second picture is larger than the threshold value, the interactive control device is still in the idle status.

2. The interactive image system of claim 1, wherein the reference point image has a size of one or more pixel cells, and the pixel area is a pixel region identical to the one or more pixel cells.

3. The interactive image system of claim 1, wherein the reference point image has a size of one or more pixel cells, and the pixel area is a pixel region including and larger than the one or more pixel cells.

4. The interactive image system of claim 1, wherein the reference point image has a size of multiple pixel cells, and the pixel area is a pixel region including a portion of the multiple pixel cells.

5. The interactive image system of claim 1, wherein the brightness information is brightness of a pixel in the pixel area or an average of brightness of pixels in the pixel area.

6. The interactive image system of claim 1, wherein the light source includes a plurality of light-emitting points capable of generating light beams each forming a reference point.

7. The interactive image system of claim 1, wherein when the interactive control device is still in the idle status after confirmation, the control circuit reduces a sampling frequency of the image sensor or notices the host to reduce a light projection frequency of the light source.

8. The interactive image system of claim 1, wherein the at least one pixel in the pixel area of the second picture includes two or more pixels, and wherein:
   when the brightness information of every one of the two or more pixels in the pixel area of the second picture is smaller than the threshold value, the interactive control device switches from the idle status to the operation status; and
   when the brightness information of at least one of the two or more pixels in the pixel area of the second picture is larger than the threshold value, the interactive control device is still in the idle status.

9. An interactive control device transmitting data to a host and switching between an operation status and an idle status, the interactive control device including:
   an image sensor capturing a first picture in the idle status, wherein the first picture has a reference point image formed by a light beam projected from a light source; and
   a control circuit selecting a pixel area according to a position of the reference point image in the first picture, wherein a size of the pixel area is smaller than a size of the first picture, controlling the image sensor to obtain a second picture by simply and only scanning the pixel area while leaving another pixel area other than the pixel area not-scanned, and comparing a threshold value with brightness information of at least one pixel in the pixel area of the second picture to confirm whether the interactive control device is still in the idle status;
   wherein when the brightness information of the at least one pixel in the pixel area of the second picture is smaller than the threshold value, the interactive control device switches from the idle status to the operation status; and
   when the brightness information of the at least one pixel in the pixel area of the second picture is larger than the threshold value, the interactive control device is still in the idle status.

10. The interactive control device of claim 9, wherein the reference point image has a size of one or more pixel cells, and the pixel area is a pixel region identical to the one or more pixel cells.

11. The interactive control device of claim 9, wherein the reference point image has a size of one or more pixel cells, and the pixel area is a pixel region including and larger than the one or more pixel cells.

12. The interactive control device of claim 9, wherein the reference point image has a size of multiple pixel cells, and the pixel area is a pixel region including a portion of the multiple pixel cells.

13. The interactive control device of claim 9, wherein the brightness information is brightness of a pixel in the pixel area or an average of brightness of pixels in the pixel area.

14. The interactive control device of claim 9, wherein when the interactive control device is still in the idle status after confirmation, the control circuit reduces a sampling frequency of the image sensor or notices the host to reduce a light projection frequency of the light source.

15. The interactive control device of claim 9, wherein the at least one pixel in the pixel area of the second picture includes two or more pixels, and wherein:
   when the brightness information of every one of the two or more pixels in the pixel area of the second picture is smaller than the threshold value, the interactive control device switches from the idle status to the operation status; and
   when the brightness information of at least one of the two or more pixels in the pixel area of the second picture is larger than the threshold value, the interactive control device is still in the idle status.

16. An operation method for an interactive image system, comprising:
- capturing a first picture when the interactive image system is in an idle status;
- selecting a pixel area according to a position of at least one reference point image in the first picture, wherein a size of the pixel area is smaller than a size of the first picture;
- obtaining a second picture by simply and only scanning the pixel area while leaving another pixel area other than the pixel area not-scanned; and
- comparing a threshold value with brightness information of at least one pixel in the pixel area of the second picture to confirm whether the interactive image system is still in the idle status;
    - wherein when the brightness information of the at least one pixel in the pixel area of the second picture is smaller than the threshold value, interactive image system switches from the idle status to the operation status; and
    - when the brightness information of the at least one pixel in the pixel area of the second picture is larger than the threshold value, the interactive image system is still in the idle status.

17. The operation method for an interactive image system of claim 16, wherein the reference point image has a size of one or more pixel cells, and the pixel area is a pixel region identical to the one or more pixel cells.

18. The operation method for an interactive image system of claim 16, wherein the reference point image has a size of one or more pixel cells, and the pixel area is a pixel region including and larger than the one or more pixel cells.

19. The operation method for an interactive image system of claim 16, wherein the reference point image has a size of multiple pixel cells, and the pixel area is a pixel region including a portion of the multiple pixel cells.

20. The operation method for an interactive image system of claim 16, wherein the brightness information is brightness of a pixel in the pixel area or an average of brightness of pixels in the pixel area.

21. The operation method for an interactive image system of claim 16, further comprising: when the interactive image system is still in the idle status after confirmation, reducing a sampling frequency of capturing pictures or reducing a light projection frequency of the light source.

22. The operation method for an interactive image system of claim 16, wherein the at least one pixel in the pixel area of the second picture includes two or more pixels, and wherein:
- when the brightness information of every one of the two or more pixels in the pixel area of the second picture is smaller than the threshold value, the interactive image system switches from the idle status to the operation status; and
- when the brightness information of at least one of the two or more pixels in the pixel area of the second picture is larger than the threshold value, the interactive image system is still in the idle status.

* * * * *